(12) United States Patent
Chung et al.

(10) Patent No.: US 7,166,323 B2
(45) Date of Patent: Jan. 23, 2007

(54) METHOD OF COATING CATALYST CARRIER LAYER OF METAL-METAL OXIDE, METHOD OF DEPOSITING ACTIVE CATALYST PARTICLES ONTO METAL SUBSTRATES FOR PREPARING METAL MONOLITH CATALYST MODULES, AND MODULE THEREBY

(75) Inventors: Jong Shik Chung, Kyungju (KR); Yong Shik Jeong, Pohang (KR); Kyung Shik Yang, Pohang (KR)

(73) Assignee: Pohang University of Science & Technology (KR)

( * ) Notice: Subject to any disclaimer, the term of this patent is extended or adjusted under 35 U.S.C. 154(b) by 232 days.

(21) Appl. No.: 10/357,086

(22) Filed: Feb. 3, 2003

(65) Prior Publication Data

US 2004/0086637 A1    May 6, 2004

(30) Foreign Application Priority Data

Nov. 5, 2002    (KR) .................. 10-2002-0068210

(51) Int. Cl.
*B05D 1/12* (2006.01)
*B05D 3/02* (2006.01)

(52) U.S. Cl. .................................. 427/180; 427/383.1
(58) Field of Classification Search ................ 502/232, 502/242, 251, 263, 341, 349–351, 355, 407, 502/415, 439, 527.15, 26, 3; 427/327, 583, 427/584, 585, 350, 372.2, 380, 180, 383.1
See application file for complete search history.

(56) References Cited

U.S. PATENT DOCUMENTS

| | | | |
|---|---|---|---|
| 3,785,781 A | | 1/1974 | Hervert et al. |
| 3,991,245 A | | 11/1976 | Jackson |
| 4,072,471 A | | 2/1978 | Morgan, Jr. et al. |
| 4,472,533 A | * | 9/1984 | Moskovits .................. 502/320 |
| 4,529,718 A | * | 7/1985 | Dupin ........................ 502/439 |
| 4,814,146 A | | 3/1989 | Brand et al. |
| 4,824,711 A | * | 4/1989 | Cagliostro et al. .......... 428/116 |
| 4,931,421 A | * | 6/1990 | Shibata ....................... 502/439 |
| 5,145,825 A | * | 9/1992 | Deeba et al. ............... 502/242 |
| 5,175,136 A | * | 12/1992 | Felthouse ................... 502/242 |

(Continued)

FOREIGN PATENT DOCUMENTS

KR    10-336821 B1    5/2002

OTHER PUBLICATIONS

Cybulski, Andrzej et al., "Monoliths in Heterogeneous Catalysis", *Catal. Rev.—Sci. Eng.*, 36(2), pp. 179-270 (1994).

*Primary Examiner*—Cam N. Nguyen
(74) *Attorney, Agent, or Firm*—The Webb Law Firm

(57) ABSTRACT

Disclosed is a method of coating a porous carrier layer of metal-metal oxide and depositing an active catalyst component on metal substrates, and a monolith module useful as a catalytic reactor with low pressure drop prepared using the metal substrate having the deposited catalyst. By forming the porous carrier particle layer on the metal substrate and depositing the catalyst particles thereon, the catalyst particles are drastically increased in deposition strength and impact durability. Also, the disclosed monolith catalyst module is used for a long time while the catalyst is not detached under high mechanical or thermal impact and high conversion efficiency thereof is maintained at a desired level, due to securely deposited catalyst particles.

14 Claims, 1 Drawing Sheet

U.S. PATENT DOCUMENTS

| | | | |
|---|---|---|---|
| 5,212,130 A * | 5/1993 | Addiego et al. | 502/60 |
| 5,246,737 A * | 9/1993 | Muradov | 427/307 |
| 5,290,739 A | 3/1994 | Hickman | |
| 5,290,748 A * | 3/1994 | Knuuttila et al. | 502/228 |
| 5,376,610 A | 12/1994 | Takahata et al. | |
| 5,403,620 A * | 4/1995 | Kaesz et al. | 427/252 |
| 5,418,056 A * | 5/1995 | Noguchi et al. | 428/323 |
| 5,455,072 A * | 10/1995 | Bension et al. | 427/255.7 |
| 5,547,641 A | 8/1996 | Smith et al. | |
| 5,589,234 A * | 12/1996 | Mori et al. | 427/597 |
| 5,681,788 A | 10/1997 | Kanesaka et al. | |
| 5,938,992 A | 8/1999 | Hamanaka et al. | |
| 5,998,522 A * | 12/1999 | Nakano et al. | 524/315 |
| 6,316,057 B1 * | 11/2001 | Hirayama et al. | 427/400 |
| 6,534,431 B1 * | 3/2003 | Suntola et al. | 502/60 |
| 6,641,908 B1 * | 11/2003 | Clough | 428/319.1 |
| 6,703,264 B2 * | 3/2004 | Yamazaki et al. | 438/149 |
| 6,790,476 B1 * | 9/2004 | Jennison et al. | 427/255.7 |
| 6,838,125 B2 * | 1/2005 | Chung et al. | 427/562 |
| 2003/0119920 A1 * | 6/2003 | Wang et al. | 518/715 |
| 2003/0149120 A1 * | 8/2003 | Wang et al. | 518/715 |
| 2004/0147620 A1 * | 7/2004 | Wang et al. | 518/715 |

* cited by examiner

METHOD OF COATING CATALYST CARRIER LAYER OF METAL-METAL OXIDE, METHOD OF DEPOSITING ACTIVE CATALYST PARTICLES ONTO METAL SUBSTRATES FOR PREPARING METAL MONOLITH CATALYST MODULES, AND MODULE THEREBY

BACKGROUND OF THE INVENTION

1. Field of the Invention

The present invention relates to methods of coating a catalyst carrier layer of metal-metal oxide and depositing a catalyst on metal substrates for preparation of metal monolith catalyst modules, and monolith modules prepared using the metal substrate having the deposited catalyst. More specifically, the present invention relates to a method of forming a porous particle layer of metal-metal oxide as a catalyst carrier by coating on a metal substrate for subsequent easy deposition of catalyst particles upon preparation of a monolith type (honeycomb) catalyst module useful as a catalytic reactor with low pressure drop; a method of depositing an active catalyst component on the porous layer of metal-metal oxide; and a monolith module useful as a catalytic reactor with low pressure drop prepared using the metal substrate having the deposited catalyst.

2. Description of the Prior Art

In case of removing pollutants, such as hydrocarbons, $NO_x$, volatile organic compounds (hereinafter, abbreviated to 'VOC'), dioxin, etc., in autoexhaust discharged from incinerators, stacks or automobiles through catalytic oxidation, or in case of performing a catalyst reforming process of hydrocarbons or alcohols used in small fuel cells or catalytic combustion devices of fuels including methane, there is required a specific support capable of dispersing catalyst particles to decrease pressure loss in reactors.

As the support functioning for dispersing-depositing of catalyst particles upon performing low pressure drop reaction, a monolith module has been widely used. In this regard, there are provided reactors suitable for use in removal of hydrocarbons, $NO_x$, VOC contained in exhaust gas discharged from the stacks by chemical reaction, or honeycomb reactors for treatment of automobile exhaust gas (Catalysis Review-Sci, and Eng., 36(2), 179–270, 1994).

In particular, in the reactors mentioned above, the ceramic honeycomb reactor was developed in the early 1970s and is still used generally. In U.S. Pat. Nos. 3,785,781, 4,072,471, 4,814,146 and 5,547,641, there are disclosed a reaction process performed using a honeycomb reactor and an installation method of the reactor. Further, in U.S. Pat. Nos. 3,991,245, 4,824,711, 5,145,825, 5,290,739, 5,376,610, 5,681,788 and 5,938,992, there are mainly disclosed a honeycomb module, an optimized catalyst material and a preparation method thereof.

However, the ceramic honeycomb reactor, which is generally used, is disadvantageous in terms of non-uniform flow distribution due to unidirectional channels and a closed structure between channels, slow diffusion rate of reactants to the catalyst's surface due to low turbulence in channels, and unnecessarily large reactor. Further, in case of wash-coating catalyst particles into the channels, the catalyst particles are not uniformly deposited and are mainly deposited to corners of square shaped channels in the reactor, thus decreasing catalytic activity. Also, the reactor having low thermal conductivity is unfavorable upon requiring fast temperature response characteristic in reactors, such as automobile autoexhaust treatment or fuel cells, and further is difficult to form in various shapes due to complex processes of extruding and molding ceramic materials.

In order to solve the problems, Korean Patent Laid-open Publication No. 2001–951 discloses a 3D-honeycomb module using a metal mesh. The 3D-honeycomb module made of metal mesh has advantages, such as high thermal conductivity, larger surface area per unit volume of the module, easy preparation, and having uniformly deposited catalyst particles. The flux flows in a channel direction as well as a direction perpendicular to channels and thus turbulent flow is formed, resulting in high mass transfer rate. Consequently, the reactor volume is decreased.

However, in case of depositing the catalyst onto a wire surface of the metal mesh instead of the ceramic honeycomb module, problems are caused, such as low deposition strength, use of large amounts of binder, and decreased activity. Hence, upon depositing the catalyst onto the metal surface of the metal mesh wire, there is an urgent need for a method of depositing catalyst particles having a high surface area with high deposition strength and stability.

SUMMARY OF THE INVENTION

Therefore, it is an object of the present invention to alleviate the problems in the prior art and to provide a method of securely coating a porous particle layer of metal-metal oxide as a catalyst carrier having high deposition strength onto a metal substrate so that catalyst particles are easily deposited onto the metal substrate.

It is another object of the present invention to provide a method of depositing a catalyst on the porous particle layer of metal-metal oxide by direct incorporation of an active catalyst component or wash-coating of separately prepared catalyst particles.

It is a further object of the present invention to provide a monolith catalyst module useful as a catalytic reactor with low pressure drop prepared using the metal substrate having the deposited catalyst.

DETAILED DESCRIPTION OF THE INVENTION

Figure 1:
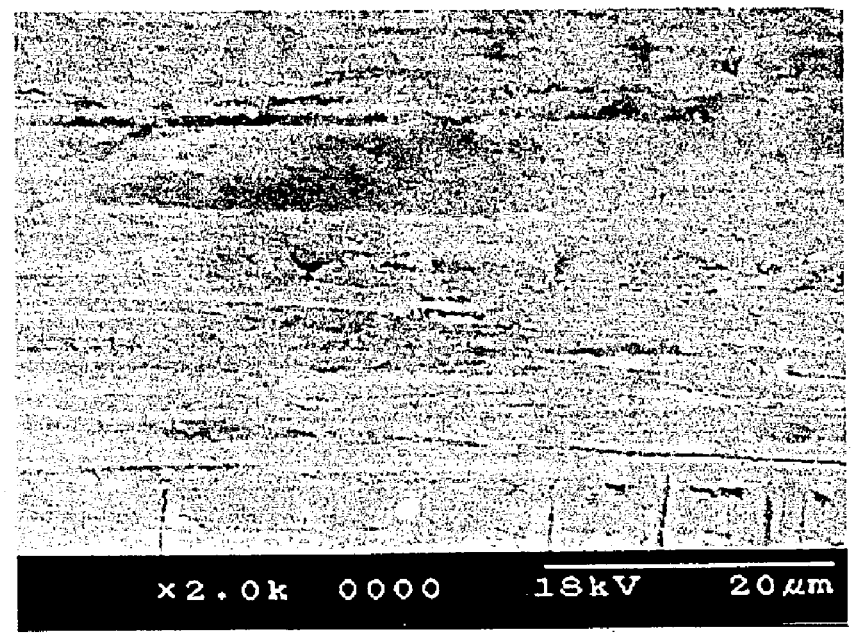
FIG. 1 is a scanning electron microscopic photograph of a wire surface of a metal mesh.

According to an embodiment of the present invention, there is provided a method of coating a porous particle layer of metal-metal oxide onto a metal substrate, comprising the steps of:

(1) washing the metal substrate with an acid or an alkali, followed by drying the washed metal substrate;

(2) coating metal particles onto the metal substrate to form a metal particle layer;

(3) partially sintering the metal particle layer at 600–1500° C. under vacuum or under an inert atmosphere; and (4) calcining the metal substrate with the partially sintered metal particle layer coated thereon at 400–1200° C., to form a metal oxide film on a surface of the metal particles, thereby preparing the porous particle layer of metal-metal oxide coated on the metal substrate.

According to another embodiment of the present invention, there is provided a method of depositing catalyst particles onto a metal substrate, comprising the steps of:
(1) washing the metal substrate with an acid or an alkali, followed by drying the washed metal substrate;
(2) coating metal particles onto the metal substrate to form a metal particle layer;
(3) partially sintering the metal particle layer at 600–1500° C. under vacuum or under an inert atmosphere;
(4) calcining the metal substrate with the partially sintered metal particle layer coated thereon at 400–1200° C., to form a metal oxide film on a surface of the metal particles, thereby preparing a porous particle layer of metal-metal oxide coated on the metal substrate; and
(5) directly incorporating the metal substrate with the porous particle layer of metal-metal oxide functioning as a catalyst carrier thereon into an active catalyst precursor-dissolved solution.

According to a further embodiment of the present invention, there is provided a method of depositing catalyst particles onto a metal substrate, comprising the steps of:
(1) washing the metal substrate with an acid or an alkali, followed by drying the washed metal substrate;
(2) coating metal particles onto the metal substrate to form a metal particle layer;
(3) partially sintering the metal particle layer at 600–1500° C. under vacuum or under an inert atmosphere;
(4) calcining the metal substrate with the partially sintered metal particle layer coated thereon at 400–1200° C., to form a metal oxide film on the surface of the metal particles, thereby preparing a porous particle layer of metal-metal oxide coated on the metal substrate; and
(5) wash-coating separately prepared active catalyst particles onto the porous coated layer of metal-metal oxide functioning as a catalyst carrier formed on the metal substrate.

According to still another embodiment of the present invention, there is provided a monolith catalyst module useful as a catalytic reactor with low pressure drop prepared using the metal substrate having the deposited catalyst particles.

Based on the present invention, the porous particle layer of metal-metal oxide is formed on the metal substrate, whereby the catalyst is more securely and easily deposited onto the metal substrate through such a porous layer.

The term "metal substrate" means a structural body made of any metal material as an electric conductor. For instance, the metal substrate may be made of any metal selected from among iron, stainless steel, aluminum or metal alloys, and comprises a mat type flat plate structure of a metal mesh or fiber, or a flat plate structure of a metal sheet. In addition, these flat plates may be corrugated. The form of the corrugated plate may be a triangle, square, lozenge or sine shape.

Before being coated with the metal particles as a catalyst carrier layer, the metal substrate is washed with an acid or alkali and dried according to any manner known in this field. Then, the washed and dried metal substrate may be selectively subjected to physical or chemical vapor deposition of a metal salt or organic metal compound precursor, and a metal component of gas phase may be thinly coated on the metal substrate, followed by performing thermal treatment at 600–1500° C., thus-forming an alloy layer on the metal substrate. Thereby, the metal particle layer functioning as a catalyst carrier is more securely coated on the metal substrate through the alloy layer, therefore resulting in maintaining catalyst activity after long term operation.

In particular, in case of coating titanium as the catalyst carrier, it is preferred that the alloy layer is formed.

As such, as the metal salt or organic metal compound which is vapor-deposited to the alloy layer, any one may be used so long as it may be vaporized to gas phase, and is exemplified by, but is not limited to, tri-isobutyl, alkoxides and chlorides of aluminum, titanium, zirconium or magnesium.

Thereafter, the metal particles as the catalyst carrier are uniformly coated onto the metal substrate or the selective alloy layer through thermal spray, plasma spray, electrophoretic deposition (EPD), painting, etc., to form the porous particle layer.

In such a case, examples of the metal coated as the catalyst carrier include, but are not limited to, aluminum, zirconium, titanium, silicon, magnesium or mixtures thereof. Upon coating the metal particles, depending on the metal materials or the coating manner, only slurry of the metal particles is used or the metal particles are used together with a metal precursor and/or an auxiliary additive to prepare a slurry solution.

As the auxiliary additive, a dispersing agent functioning to uniformly disperse the particles in the slurry solution, a conductivity regulator for regulating electroconductivity of the slurry solution, a surfactant and a binder can be used and, each of which is known to those skilled in the art.

Then, the layer of the metal particles coated on the metal substrate or the selective alloy layer is partially sintered through thermal treatment at 600–1500° C. under vacuum or under an inert atmosphere. Thereby, individual metal particles are mutually adhered, forming a porous structure, and are alloyed on the metal substrate, thus securely attaching the porous metal particle layer to the metal substrate. If the temperature upon thermal treatment exceeds 1500° C., the metal particles are completely sintered and thus the desired porous particle layer on the metal surface is not formed. On the other hand, if the temperature is too low, the metal particles are not sintered and adhered, thus the desired porous particle layer on the metal substrate cannot be obtained. Hence, it is preferred that the sintering process is performed at 600–1500° C.

Then, with the intention of thinly oxidizing only the surface of each of the metal particle coated on the metal substrate or the selective alloy layer, the metal substrate having the partially sintered metal particle layer coated thereon is calcined in air at 400–1200° C. to be oxidized. When the calcination temperature exceeds 1200° C. or is performed for a longer time, the whole metal particle layer is converted to a metal oxide layer and thus the coated metal particle layer becomes hardened and is easily detached from the metal substrate. Meanwhile, if the temperature is lower than 400° C., the oxide layer is not formed. The metal oxide film on each metal particle surface is preferably formed to be as thin as possible, for example, at a thickness of 1000 Å or less.

By calcining the metal substrate having the partially sintered metal particle layer coated thereon at 400–1200° C., there is provided a porous particle layer with cherry type porous particle comprising a metal inner layer covered with a metal oxide outer layer.

An active catalyst component is incorporated into the porous coated layer of metal-metal oxide. Incorporation of the catalyst component is performed by immersing the metal substrate, which is coated with the metal particle layer functioning as the catalyst carrier, in a solution containing a metal precursor catalyzing a specific reaction on a carrier surface, thus directly incorporating the catalyst component into the porous metal carrier layer. Otherwise, active catalyst particles having separately deposited porous particles are wash-coated to the porous metal carrier layer, thus depositing the catalyst thereto.

In the case of direct incorporation of the active catalyst precursor, a monolith metal substrate having the coated catalyst carrier is immersed in an aqueous solution of metal salt or alcohol solution such as metal alkoxide, dried and oxidized or reduced, thus depositing the catalyst onto the metal substrate.

In the case of performing wash-coating, the metal substrate having the porous particle layer of metal-metal oxide coated is immersed in a slurry solution of active catalyst particles and wash-coated, dried and oxidized or reduced, thus depositing the catalyst onto the metal substrate.

Consequently, the catalyst is deposited on the porous particle layer of metal-metal oxide coated on the metal substrate, whereby the catalyst is more securely deposited thereon, compared to directly depositing the-catalyst on the metal substrate, thus increasing the deposited catalyst amount and preventing the catalyst from detaching from the substrate under impact.

No limitations are imposed on the catalyst capable of being deposited onto the metal-metal oxide layer of the metal substrate, and any catalyst which is known in this field may be used and deposited on to the catalyst carrier layer of metal-metal oxide on the metal substrate.

The monolith catalyst module useful as a catalytic reactor with low pressure drop is advantageous in terms of increased catalyst life and stability and excellent catalytic activity, due to use of the metal substrate having the securely deposited catalyst.

Having generally described this invention, a further understanding can be obtained by reference to certain specific examples which are provided herein for purposes of illustration only and are not intended to be limiting unless otherwise specified.

EXAMPLE 1

Catalyst Coating onto Metal Wire-Mesh Containing Porous Layer

Flat plates and corrugated plates (regular triangle type folds, interval between folds: 5 mm) of a stainless metal mesh (wire diameter: 0.5 mm, one hole size of a mesh: 1.2 mm) having a width of 100 mm and a length of 150 mm was washed with a sulfuric acid solution and dried. A photograph of the metal mesh wire surface taken by a scanning electron microscope is shown in FIG. 1.

1000 ml of ethanol and water mixed at a weight ratio of 2:1 was added with 7.5 g of aluminum metal powder, 0.001 M aluminum isopropoxide, 0.001 M triethylamine(TEA), to prepare a slurry solution.

Figure 2:
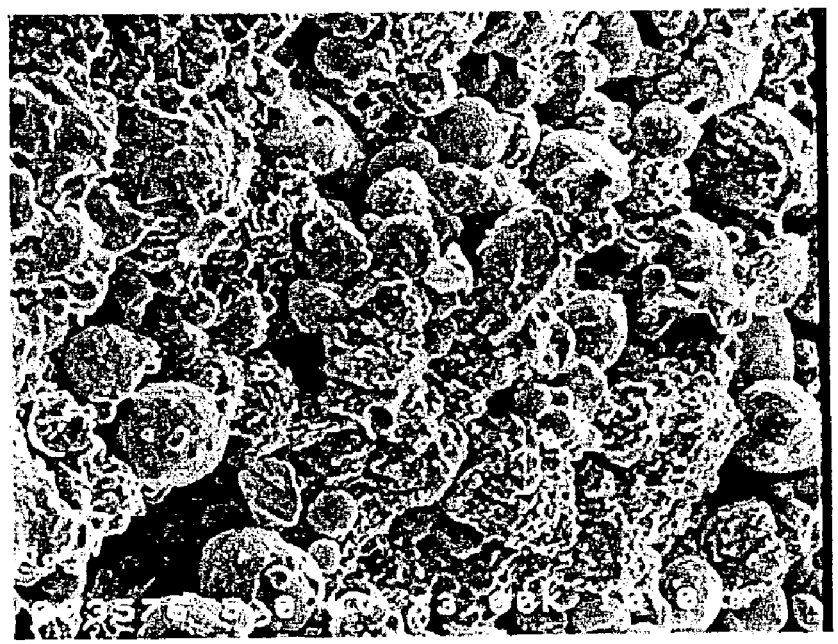
FIG. 2 is a scanning electron microscopic photograph of a wire surface of a metal mesh having a porous particle layer of metal-metal oxide coated by the method of the present invention.

The metal mesh was dipped into the slurry solution, and the metal mesh functioning as an electrode was coated with aluminum powder at 100 V by an EPD method, followed by removing the coated metal mesh from the solution and drying. The coated metal mesh was thermally treated at 900° C. for 10 hours, and calcined at 600° C. for 8 hours, to prepare a porous carrier layer of aluminum-alumina 20 µm thick. The flat plates and the corrugated plates of the metal mesh were alternately stacked to form a honeycomb rectangular hexahedron having a width of 100 mm and a length of 150 mm. The surface of such a honeycomb monolith module for depositing the catalyst, seen under a scanning electron microscope, is shown in FIG. 2. As shown in the drawing, an alumina carrier layer having high surface area and high porosity is formed on each wire, thus more easily depositing the catalyst thereto.

The honeycomb module having the coated carrier layer was covered with a catalyst slurry solution comprising 5 g of 1% $Pt/TiO_2$ catalyst, 0.5 g of silica sol and 200 g of water, thus wash-coating the catalyst to the module. The wash-coated module was dried at 100° C. in an oven for 1 hour, and cancined at 500° C. for 10 hours, to prepare a final honeycomb catalyst module (catalyst module 1).

EXAMPLE 2

Catalyst Coating onto Metal Wire-Mesh Containing Porous Layer

A catalyst module was prepared in the same manner as in the above example 1, except that the honeycomb module having the coated carrier layer was covered with a catalyst slurry solution comprising 5 g of 2% V-6% $W/TiO_2$ catalyst, 0.5 g of silica sol and 200 g of water, to perform wash-coating of active catalyst particles (catalyst module 2).

EXAMPLE 3

Catalyst Coating onto Metal Wire-Mesh Containing Porous Layer

A catalyst module was prepared in the same manner as in the above example 1, except that the honeycomb module having the coated carrier layer was covered with a catalyst slurry solution comprising 5 g of 5% Ni-3% $Pd/Al_2O_3$ catalyst, 0.5 g of silica sol and 200 g of water, to perform wash-coating, of the active catalyst particles (catalyst module 3).

EXAMPLE 4

Catalyst Coating onto Metal Wire-Mesh Containing Porous Layer

Before performing an EPD method upon preparation of a catalyst module in the above example 1, the metal mesh heated to 300° C. was passed through argon gas containing $TiCl_4$, and Ti layer being 0.1 µm thick was thinly deposited thereon by a vapor deposition method. The deposited Ti layer was thermally treated at 1100° C. for 10 hours under vacuum and alloyed on the mesh wire, to form a very dense and rigid alloy layer.

1000 ml of an ethanol solution was introduced with 7.5 g of titanium metal powder, 0.001 M titanium isopropoxide, and 0.001 M triethylamine(TEA), to prepare a slurry solution, into which the metal mesh as the electrode was dipped, followed by coating the titanium powder on the metal mesh at 100 V by an EPD method. The coated metal mesh was removed from the solution and dried, and was thermally treated at 1000° C. for 15 hours, and calcined at 600° C. for 10 hours, to manufacture a porous titania carrier layer 20 µm thick. After the titanium carrier layer-formed metal mesh was incorporated into a saturated aqueous solution of chloroplatinic acid, a series of processes of drying at 100° C. for 1 hour and calcining at 500° C. for 10 hours were repeatedly performed, to prepare a catalyst comprising 1% Pt-incorporated $TiO_2$ carrier particle layer.

The flat plates and the corrugated plates of the catalyst-deposited metal mesh were alternately stacked to form a final honeycomb catalyst module of a rectangular hexahedron having a width of 100 mm and a length of 150 mm (catalyst module 4).

EXAMPLE 5

Catalyst Coating onto Metal Wire-Mesh Containing Porous Layer After Metal Vapor Deposition After the metal mesh coated with the catalyst carrier layer prepared in the above example 4 was dipped into an aqueous solution of ammonium metavanatate and ammonium tungstate dissolved at a metal mole ratio of 1:3, a series of processes of drying at 100° C. for 1 hour and calcining at 500° C. for 10 hours were repeatedly performed, to prepare a catalyst comprising 2% V and 6% W-incorporated $TiO_2$ carrier particle layer (catalyst module-5).

EXAMPLE 6

Catalyst Coating onto Metal Wire-Mesh Containing Porous Layer After Metal Vapor Deposition The metal mesh heated to 250° C. was passed through argon gas containing $AlCl_3$, and an Al layer (0.1 µm thickness) was thinly deposited on the metal mesh by a vapor deposition method. The deposited Al layer was thermally treated at 1000° C. for 10 hours under vacuum, to form a very dense and rigid alloy layer on the metal mesh. 1000 ml of the ethanol solution was added with 7.5 g of aluminum metal powder, 0.001 M aluminum isopropoxide, and 0.001 M TEA, to prepare a slurry solution. Then, the metal mesh as the electrode was dipped into the slurry solution, followed by coating the aluminum powder onto the metal mesh at 100 V by an EPD method. The coated metal mesh was removed from the solution and dried, and was thermally treated at 900° C. for 15 hours, and calcined at 600° C. for 10 hours, to manufacture a porous alumina carrier layer 20 µm thick. After the alumina carrier layer-formed metal mesh was dipped into an aqueous solution of dissolved nickel nitrate and palladium chloride, a series of processes of drying at 100° C. for 1 hour and reducing at 450° C. for 10 hours were repeatedly performed, to prepare a catalyst comprising 5% Ni and 3% Pd-incorporated alumina carrier particle layer. The flat plates and the corrugated plates of the catalyst-deposited metal mesh were alternately stacked to form a final honeycomb catalyst module of a rectangular hexahedron having a width of 100 mm and a length of 150 mm (catalyst module 6).

COMPARATIVE EXAMPLE 1

Catalyst Coating onto Non-Treated Metal Wire-Mesh

An iron mesh of a flat plate and a corrugated plate was treated with sulfuric acid to roughen the surface thereof, after which the mesh was calcined at 600° C. for 5 hours, to form an oxide film of $Fe_3O_4$ on the wire, which was then wash-coated with a catalyst slurry solution comprising 5 g of 1% $Pt/TiO_2$ catalyst, 0.5 g of silica sol and 200 g of water. The wash-coated mesh was dried at 100° C. for 1 hour and calcined at 500° C. for 10 hours. The flat plates and the corrugated plates of the metal mesh having the catalyst deposited directly thereon were alternately stacked to form a final honeycomb catalyst module of a rectangular hexahedron having a width of 100 mm and a length of 150 mm (catalyst module 7).

COMPARATIVE EXAMPLE 2

Catalyst Coating onto Non-Treated Metal Wire-Mesh

A catalyst module was prepared in the same manner as in the above comparative example 1, except that 2% V-6% $W/TiO_2$ catalyst was used instead of 1% $Pt/TiO_2$ (catalyst module 8).

COMPARATIVE EXAMPLE 3

Catalyst Coating onto Non-Treated Metal Wire-Mesh

A catalyst module was prepared in the same manner as in the above comparative example 1, except that 5% Ni-3% $Pd/Al_2O_3$ catalyst was used instead of 1% $Pt/TiO_2$ (catalyst module 9).

EXAMPLE 7

VOC Oxidation according to Reaction Temperature and Time

Each of the honeycomb catalysts for VOC oxidation prepared in the above examples 1 and 4, and the above comparative example 1 was installed to a center portion of a fixed bed reactor, to perform VOC oxidation experiment. As such, the reactant was 1000 ppm 1,2-dichlorobenzene (o-DCB), and experimental conditions were a gas hourly space-velocity (GHSV) of 20,000/hr and a reaction temperature of 200–300° C. The conversion efficiencies at initial reaction and after 6 months were measured. The results are shown in Table 1, below.

TABLE 1

| | | Temp. (° C.) | | | |
|---|---|---|---|---|---|
| 1,2-Diclorobenzene Conversion (%) | | 210 | 240 | 270 | 300 |
| Catalyst Module 1 | Initial Reaction | 66 | 88 | 95 | 98 |
| | After 6 Months | 65 | 88 | 94 | 98 |
| Catalyst Module 4 | Initial Reaction | 67 | 89 | 97 | 99 |
| | After 6 Months | 67 | 89 | 97 | 99 |
| Catalyst Module 7 | Initial Reaction | 67 | 88 | 96 | 98 |
| | After 6 Months | 59 | 73 | 82 | 86 |

As seen in the above table 1, oxidation of dichlorobenzene results in that the catalyst module 7 having catalyst particles directly deposited to the metal mesh is similar in initial conversion efficiency to the catalyst modules 1 and 4 of the present invention. However, after using the catalyst modules for a long time such as 6 months, the catalyst module 7 is decreased in catalytic activity due to detachment of the deposited catalyst. Whereas, since the catalyst modules 1 and 4 of the present invention have the catalyst deposited securely through the coated catalyst carrier, conversion efficiencies are continuously maintained at a desired predetermined level even after the module is used for 6 months.

EXAMPLE 8

Test of Catalyst Coating Adherence of Honeycomb Module After VOC Oxidation

To confirm catalyst deposition strength of the modules used in the above example 7, the modules were placed in a cylindrical container and subjected to shaking test by use of a shaker. As such, the shaking test was performed at 500 rpm for 1, 5 and 10 hours. After shaking, the amount of detached catalyst was determined. The results are given in Table 2, below.

TABLE 2

| Catalyst Layer Wear Ratio (%) | After 1 h. | After 5 h. | After 10 h. |
| --- | --- | --- | --- |
| Catalyst Module 1 | 0.3 | 0.6 | 0.9 |
| Catalyst Module 4 | 0.2 | 0.6 | 0.7 |
| Catalyst Module 7 | 3 | 9.5 | 17.5 |

As shown in the above table 2, in the catalyst module 7 having the catalyst directly coated to the metal mesh, 17.5% of catalyst is detached from the metal mesh after performing the shaking test under harsh conditions for 10 hours. Thus, the catalyst module 7 is decreased in catalytic activity upon using for a long time as in the above example 7. However, three dimensional honeycomb modules having the catalyst deposited by the method of the present invention have a catalyst wear ratio less than 1% even under harsh shaking for 10 hours. From this, it can be seen that the present modules are superior in deposition strength to conventional modules, and are not decreased in catalytic activity even after being used for a long time. Particularly, in the above catalyst modules of the present invention, the catalyst module 4, which is prepared by primarily coating a metal component to the wire surface of the metal mesh using a vapor deposition method and coating metal carrier particles thereto, is superior in deposition strength of the catalyst to the catalyst module 1 prepared by directly coating the metal carrier particles to the wire surface of the metal mesh.

EXAMPLE 9

$NO_x$ Reduction according to Reaction Temperature

Each of the honeycomb catalysts for $NO_x$ reduction prepared in the above example 5 and the above comparative example 2 was installed to a center portion of a fixed bed reactor as in the above example 7, after which the $NO_x$ reduction experiment was performed. As such, with the aim of selective reduction of NO, a reactant comprising 500 ppm NO, 500 ppm ammonia, 8% water and residue of air components was used under the conditions of GHSV 20,000/hr and a reaction temperature of 250–400° C. The conversion results are given in Table 3, below.

TABLE 3

| | | Temp. (° C.) | | | |
| --- | --- | --- | --- | --- | --- |
| $NO_x$ Conversion (%) | | 250 | 300 | 350 | 400 |
| Catalyst Module 5 | Initial Reaction | 40 | 72 | 96 | 90 |
| | After 6 Months | 38 | 70 | 95 | 90 |
| Catalyst Module 8 | Initial Reaction | 39 | 70 | 95 | 88 |
| | After 6 Months | 25 | 55 | 80 | 81 |

As shown in the above table 3, selective reduction of NO results in that the catalyst module 5 of the present invention and the catalyst module 8 having catalyst particles directly coated to the metal wire are similar in their initial conversion efficiencies. However, after a long time, such as 6 months, the reactor equipped with the catalyst module 8 is drastically decreased in catalytic activity due to detachment of the catalyst particles, whereas the honeycomb reactor of the present invention maintains its conversion efficiency at almost its initial level at all temperature ranges.

EXAMPLE 10

Test of Catalyst Coating Adherence of Honeycomb Module After $NO_x$ Reduction

To confirm the catalyst deposition strength of the modules used in the above example 9, the prepared modules were placed in a cylindrical container and subjected to the shaking test as in the above example 8. As such, the shaking test was performed at 500 rpm for 1, 5 and 10 hours. After shaking, the amount of detached catalyst was determined. The results are shown in Table 4, below.

TABLE 4

| Catalyst Layer Wear Ratio (%) | After 1 h. | After 5 h. | After 10 h. |
| --- | --- | --- | --- |
| Catalyst Module 5 | 0.2 | 0.5 | 0.7 |
| Catalyst Module 8 | 5.2 | 12.4 | 19.3 |

As shown in the-above table 4, in the catalyst module 8, 20% of catalyst is detached under shaking conditions after 10 hours, while the catalyst module 5 of the present invention has a catalyst wear ratio less than 1% even after shaking for 10 hours. From this, it can be seen that the inventive module is excellent in catalyst deposition strength, compared to the conventional module.

EXAMPLE 11

Reforming Process of Iso-octane according to Reaction Temperature

Each of the honeycomb catalysts for iso-octane reforming process prepared as in the above examples 3(catalyst module 3) and 6(catalyst module 6), and the above comparative example 3(catalyst module 9), was installed to a center portion of a fixed bed reactor, after which the iso-octane reforming test was performed. As such, a reactant was 100,000 ppm iso-octane and the test was performed under the conditions of GHSV 9,000/hr, $H_2$ O/C=3, O/C=1, and 500–650° C. The conversion efficiency results are shown in Table 5, below.

TABLE 5

| Temp. (° C.) | Reactor | Iso-Octane Conversion (%) | $H_2:CH_4:CO:CO_2$ |
| --- | --- | --- | --- |
| 500 | Catalyst Module 3 | 35 | 40:0:4:56 |
| | Catalyst Module 6 | 35 | 41:0:3:56 |
| | Catalyst Module 9 | 33 | 38:0:5:57 |
| 550 | Catalyst Module 3 | 52 | 71:0:5:24 |
| | Catalyst Module 6 | 53 | 71:0:5:24 |
| | Catalyst Module 9 | 52 | 69:0:5:26 |
| 600 | Catalyst Module 3 | 71 | 72:10:8:10 |
| | Catalyst Module 6 | 72 | 75:10:7:8 |
| | Catalyst Module 9 | 60 | 66:13:9:12 |
| 650 | Catalyst Module 3 | 82 | 70:17:7:6 |
| | Catalyst Module 6 | 85 | 72:16:6:6 |
| | Catalyst Module 9 | 65 | 65:20:8:7 |

As shown in the above table 5, reforming process of iso-results octane results in that the catalyst modules 3 and 6 having the carrier particles coated by the method of the present invention have higher conversion efficiency than that of the catalyst module 9 having directly coated catalyst. Further, a hydrogen component was produced in high concentration. In particular, it can be shown that the catalyst module 6 prepared by forming a thin alloy layer on the metal mesh wire by use of a vapor deposition method and coating the catalyst carrier thereon has high initial conversion efficiency, as well as after using for a long period of time.

EXAMPLE 12

Test of Catalyst Coating Adherence of Honeycomb Module After Iso-octane Reforming To confirm the catalyst deposition strength of modules used in the above example 11, the prepared modules were placed in a cylindrical container and subjected to the shaking test as in the above example 8. As such, the shaking test was performed under harsher conditions of 1000 rpm for 5, 20 and 40 hours, compared to the above example 8. After the shaking, the amount of detached catalyst amount was determined. The results are shown in table 6, below.

TABLE 6

| Catalyst Layer Wear Ratio (%) | After 5 h. | After 20 h. | After 40 h. |
|---|---|---|---|
| Catalyst Module 3 | 0.9 | 1.9 | 3.4 |
| Catalyst Module 6 | 0.1 | 0.2 | 0.4 |
| Catalyst Module 9 | 17.4 | 27.3 | 36.5 |

As shown in the above table 6, in the catalyst module 9 having the catalyst deposited directly to the metal mesh, the catalyst is easily detached under shaking conditions for a long time, but the honeycomb catalyst modules of the present invention have excellent catalyst deposition strength even after shaking for 40 hours. Particularly, in the above catalyst modules of the present invention, the catalyst module 6 prepared by forming a thin alloy layer on the metal mesh wire by use of a vapor deposition method and coating the catalyst carrier thereto by use of an EPD method, has little detached catalyst under harsh condition of 40 hours.

As described above, the carrier particle layer of metal-metal oxide coated onto the metal substrate is considerably increased in deposition stability and impact durability and has high porosity. By depositing the catalyst particles to the porous carrier layer, the deposition strength of the catalyst particles is also drastically increased. The catalyst particles deposited by the method of the present invention are not detached from the metal substrate under strong mechanical or thermal impact, and exhibit and maintain high catalytic activity in a practical process and can be used for a long time. The monolith catalyst module prepared by using the metal substrate of the present invention can be used under harsher conditions. Further, the alloy layer is provided before forming the porous carrier particle layer, thereby increasing deposition stability and impact durability of the porous carrier particle layer.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method of coating a porous particle layer of metal-metal oxide on a metal substrate, comprising the steps of:
   (1) washing the metal substrate with an acid or alkali, followed by drying the washed metal substrate;
   (2) coating metal particles onto the metal substrate to form a metal particle layer;
   (3) partially sintering the metal particle layer at 600–1500° C. under vacuum or under an inert atmosphere; and
   (4) calcining the metal substrate with the partially sintered metal particle layer coated thereon at 400–1200° C., to form a metal oxide film on a surface of the metal particles, thereby preparing the porous particle layer of metal-metal oxide coated on the metal substrate.

2. The method as defined in claim 1, wherein the metal particles are selected from a group consisting of aluminum, zirconium, titanium, silicon, magnesium and mixtures thereof.

3. The method as defined in claim 1, further comprising, after the step (1),
   coating a metal salt or an organic metal compound onto the metal substrate by physical or chemical vapor deposition and then thermally treating at 600–1500° C.

4. The method as defined in claim 3, wherein the metal salt or organic metal compound is selected from the group consisting of tri-isobutyl, alkoxides and chlorides of aluminum, titanium, zirconium and magnesium.

5. A method of depositing catalytic particles onto a metal substrate, comprising the steps of:
   (1) washing the metal substrate with an acid or alkali, followed by drying the washed metal substrate;
   (2) coating metal particles onto the metal substrate to form a metal particle layer;
   (3) partially sintering the metal particle layer at 600–1500° C. under vacuum or under an inert atmosphere;
   (4) calcining the metal substrate with the partially sintered metal particle layer coated thereon at 400–1200° C., to form a metal oxide film on surface of the metal particles, thereby preparing a porous particle layer of metal-metal oxide on the metal substrate; and
   (5) directly incorporating the metal substrate with the porous particle layer of metal-metal oxide functioning as a catalyst carrier coated thereon into an active catalyst precursor-dissolved solution.

6. A monolith catalyst module useful as a catalytic reactor with low pressure drop prepared using the metal substrate having the catalyst deposited by the method of claim 5.

7. The method as defined in claim 5, wherein the metal particles are selected from a group consisting of aluminum, zirconium, titanium, silicon, magnesium and mixtures thereof.

8. The method as defined in claim 5, further comprising, after the step (1),
   coating a metal salt or an organic metal compound onto the metal substrate by physical or chemical vapor deposition and then thermally treating at 600–1500° C.

9. The method as defined in claim 8, wherein the metal salt or organic metal compound is selected from the group consisting of tri-isobutyl, alkoxides and chlorides of aluminum, titanium, zirconium and magnesium.

10. A method of depositing catalyst particles onto a metal substrate, comprising the steps of:
  (1) washing the metal substrate with an acid or alkali, followed by drying the washed metal substrate;
  (2) coating metal particles onto the metal substrate to form a metal particle layer;
  (3) partially sintering the metal particle layer at 600–1500C. under vacuum or under an inert atmosphere;
  (4) calcining the metal substrate with the partially sintered metal particle layer coated thereon at 400–1200° C., to form a metal oxide film on a surface of the metal particles, thereby preparing a porous particle layer of metal-metal oxide coated on the metal substrate; and
  (5) wash-coating separately prepared active catalyst particles onto the porous particle layer of metal-metal oxide functioning as a catalyst carrier coated on the metal substrate.

11. The method as defined in claim 10, wherein the metal particles are selected from a group consisting of aluminum, zirconium, titanium, silicon, magnesium and mixtures thereof.

12. The method as defined in claim 10, further comprising, after the step (1),
  coating a metal salt or an organic metal compound onto the metal substrate by physical or chemical vapor deposition and then thermally treating at 600–1500° C.

13. The method as defined in claim 12, wherein the metal salt or organic metal compound is selected from the group consisting of tri-isobutyl, alkoxides and chlorides of aluminum, titanium, zirconium and magnesium.

14. A monolith catalyst module useful as a catalytic reactor with low pressure drop prepared using the metal substrate having the catalyst deposited by the method of claim 10.

* * * * *